UNITED STATES PATENT OFFICE.

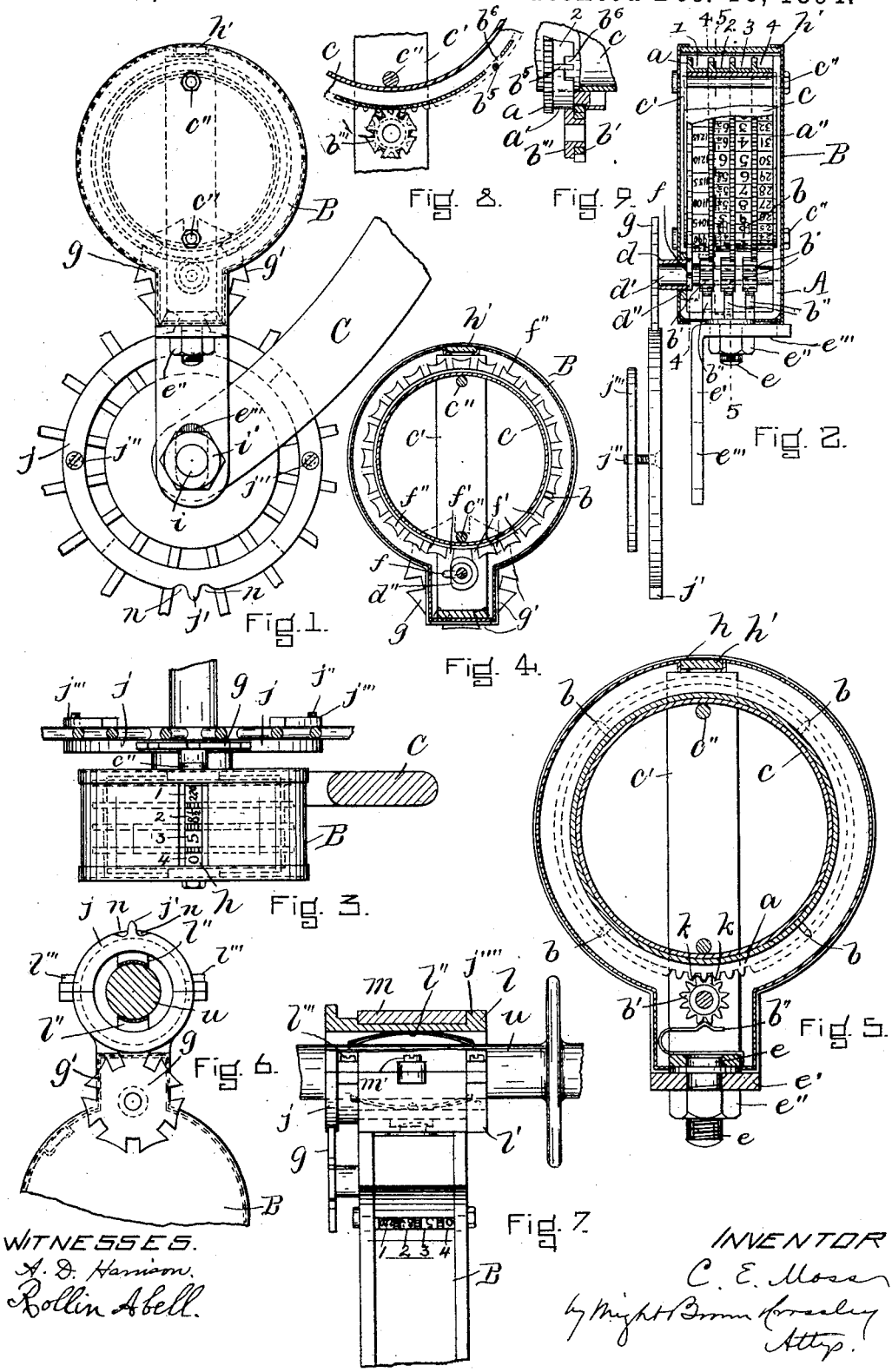

CHARLES E. MOSS, OF BOSTON, MASSACHUSETTS.

CYCLOMETER.

SPECIFICATION forming part of Letters Patent No. 531,207, dated December 18, 1894.

Application filed March 19, 1894. Serial No. 504,137. (No model.)

*To all whom it may concern:*

Be it known that I, CHARLES E. MOSS, of Boston, in the county of Suffolk and State of Massachusetts, have invented certain new and useful Improvements in Cyclometers, of which the following is a specification.

My invention relates to that class of instruments known as cyclometers and used for the purpose of determining the distance traveled by a bicycle or other moving vehicle.

The object of my improvement is to provide at a low cost a simple, accurate, and durable cyclometer adapted to indicate a large total number of miles and to be readily set for the commencement of a journey.

My invention consists in the improvements which I will now proceed to describe and claim.

Of the accompanying drawings, forming 20 part of this specification,—Figure 1 is a front elevation. Fig. 2 is a vertical section, partially in elevation. Fig. 3 is a plan view. Fig. 4 is a vertical section on lines 4—4 of Fig. 2. Fig. 5 is an enlarged vertical section on line 5—5 of Fig. 2, looking in the opposite direction from Fig. 4. Figs. 6, 7, 8, and 9 are details illustrating modifications.

The same letters and numerals of reference indicate the same parts in all the figures.

In the drawings—1, 2, 3, 4, Fig. 2, represent the registering wheels which are shown in section and partially in elevation. Each registering wheel has a flange $a$ which is cut to form gear-teeth the wheel 1 having the peculiarly formed teeth $f''$ shown in Fig. 4, while the wheels 2 3 4 have ordinary gear-teeth $k$ of the form shown in Fig. 5. The periphery of each wheel is provided with a suitable series of numbers or graduations, as shown in Fig. 2. From the periphery of each of the registering wheels 1, 2, 3 project one or more pins or projections $b$ for the purpose of transmitting motion to the pinions $b'$ $b'$ $b'$ (Figs. 2, 4, and 5). The registering wheels turn loosely upon a suitable bearing, here shown as a tube $c$ (Figs. 4 and 5), said tube being clamped between the sides $c'$ of a U-shaped frame or holder A by bolts $c''$ passing through the said sides. The U-shaped holder A is provided with a bearing $d$ and with a supporting stud $e$. In the bearing $d$ turns a shaft $d'$, which is provided with a flange or collar $d''$ (Figs. 2 and 4), said collar being cut away at one side, where a pin $f$ is inserted in the collar for the purpose of transmitting motion to the registering wheel 1, by engaging the teeth $f''$ formed thereon. The teeth $f'''$ have concave outer edges which fit the periphery of the collar $d''$, so that the wheel 1 is locked by said collar excepting when the pin $f$ enters a slot $f'$ between two of said teeth, the depressed side of the collar $d''$ then permitting movement of the wheel 1. To the shaft $d'$ is affixed a wheel $g$ having a series of teeth provided with concave outer edges, as shown in Figs. 1, 4, and 6.

$j$ represents a ring which is fastened to one of the wheels of the bicycle and is provided with a tooth $j'$ for the purpose of imparting motion to the wheel $g$ by entering the slots between the teeth $g'$. The periphery of the ring fits the concave edges of said teeth and prevents rotation of the wheel $g$ until the tooth $j'$ enters a slot in said wheel, when rotation of the wheel is permitted by depressions $n$ in the periphery of the ring at opposite sides of said tooth. The ring $j$ is screwed to the spokes of the wheel by the screws $j''$ passing through the ring between spokes, and elongated curved nuts $j'''$ engaged with said screws at the opposite side of the spokes from the ring, each nut bearing on several spokes.

Turning loosely upon the shaft $d'$ are the pinions $b'$ $b'$ $b'$ said pinions being in mesh with the teeth $k$ upon the registering wheels 2 3 4. Said pinions are held in a normal position by the springs $b''$ $b''$ $b''$ as shown in the enlarged view, Fig. 5.

The whole mechanism is surrounded by the case B, which is provided with an opening $h$ (Fig. 3) to permit inspection of the graduations. The opening $h$ is provided with the glass $h'$ for the purpose of excluding dirt.

The cyclometer is secured to a bracket $e'$ by the nut $e''$. The said bracket is secured to the fork C by means of the bolt $i$ and nut $i'$ (Fig. 1), said bolt passing through a slot $e'''$ which permits adjustment of the cyclometer.

The operation is as follows: The ring $j$ is rotated with the wheel of the bicycle, and the tooth $j'$ is thus caused to engage the slots of the wheel $g$ and impart a step-by-step motion to said wheel, the wheel being locked, as already described, after each partial rotation, by the engagement of the periphery of the ring with the concave faces of the teeth $g'$. A step-by-step rotation is thus imparted to the shaft $d'$ and collar $d''$, the pin $f$ on said collar engaging the teeth $f''$ of the registering wheel 1 and giving said wheel a single step for each complete rotation of the bicycle wheel, the said registering wheel being locked when not engaged by the pin $f$, by the engagement of the periphery of the collar $d''$ with the concave faces of the teeth $f''$.

It will be seen by Fig. 2 that each of the pinions $b'$ $b'$ $b'$ is made of sufficient width to engage the teeth $k$ of one of the wheels 2 3 4 and to extend over into the plane of the preceding wheel. Each of the wheels 1 2 3 has a pin $b$ as already stated, and each pin is formed to engage one of the pinions $b'$ and impart a partial rotation thereto. It will be seen, therefore, that each complete rotation of the wheel 1 will cause the pin $b$ on said wheel to engage the first pinion $b'$ and through the latter impart a single step rotation to the registering wheel 2, and so on through the series, the pin of each wheel 1 2 3 imparting a single step rotation to the next wheel. During the step-by-step rotation of each of the wheels 1 2 3 the pin $b$ thereon will enter the space between two of the teeth of the corresponding pinion and will move said pinion a distance equal to the width of two of its teeth. When the pin leaves the pinion, the spring $b''$ arrests the pinion and prevents accidental movement thereof and of the registering wheel. It will be readily seen that it makes no difference in which direction the wheels are turned, as the pin $b$ is adapted to enter the pinion upon either side.

I prefer to proportion or graduate the registering wheels as follows: The first registering wheel 1 makes one complete revolution during a quarter-mile, and has a scale of feet upon its index. The registering wheel 2 has forty divisions upon its index, and each division represents a quarter-mile, said wheel being moved one division during every revolution of the registering wheel 1, thus registering the quarter-mile traveled. When the registering wheel 2 has been moved forty divisions, or one complete revolution, by the pin $b$ in the registering wheel 1, it will be seen that forty quarter-miles or ten miles have been traveled. During the last quarter-mile registered on the wheel 2, the pin $b$ of that wheel will engage with the pinion and move the next succeeding registering wheel 3 one division, thus registering the ten miles traveled. The wheel 3 has forty divisions, and is only moved once in every ten miles, or one division for every revolution of the wheel 2. The index on the registering wheel 3 consists of four series of figures from 0 to 9, every ten divisions representing one hundred miles. After the registering wheel 3 has made a quarter-rotation, or ten divisions, its pin $b$ will then move the registering wheel 4 one division, registering the one hundred miles traveled. As shown by dotted lines in Fig. 5, the wheel 3 is provided with four pins $b$ $b$ $b$ $b$, one pin for each series of figures, this number of pins being provided for the purpose of making the mechanism do its own calculation, as every quarter-rotation of the wheel 3 records one hundred miles by moving the wheel 4 one division; and each complete rotation of the wheel 3 will show that four hundred miles have been traveled. The index upon the wheel 4 runs from 0 to 39, each figure representing one hundred miles.

It will be seen that the wheel 2 represents units, the wheel 3 tens, and the wheel 4 hundreds, and the distance traveled equals the number of miles showing through the opening $h$.

The cyclometer will register from zero to three thousand nine hundred and ninety-nine and three-fourths miles, and during the last quarter each wheel will be turned to the position from which it started.

Figs. 8 and 9 show a modification whereby the springs $b''$ are dispensed with and the flange $a$ of each of the wheels 1 2 3 has a pin $b^5$ inserted laterally, as shown in Fig. 9. The pinion $b'$ has fastened to it the wheel $b'''$ which has a series of teeth with concave outer edges or faces, which are prevented from moving by the periphery of the corresponding registering wheel, until the pin $b^5$ reaches one of the slots of the wheel $b^3$ when a notch $b^6$ (Fig. 8) cut in the registering wheel permits the pivotal rotation of the wheel $b^3$. This arrangement causes the registering wheels to lock the pinions after each partial rotation.

Figs. 6 and 7 show respectively a front and a side view, showing the cyclometer suspended from the hub $u$ of the wheel. Surrounding the hub is a sleeve consisting of two sections $l$ $l'$ to which are fastened the stiff springs $l''$. The sections $l$ $l'$ are detachably connected by the screws $l'''$ and hold the springs against the hub $u$, said springs constituting jaws which secure the sleeve to the hub. The springs may be serrated, as shown in Fig. 6, to cause more friction if necessary. Upon one end of the sleeve is the toothed ring $j'$. On the other is the collar $j''''$. Surrounding the sleeve is the bearing $m$, which is also made in two sections held together by the screws $m'$. The cyclometer casing is fastened to the lower part of the bearing $m$, and as the sleeve is revolved, by being held to the hub by the springs $l''$, the tooth $j'$ will engage with the slots upon the wheel $g$ and revolve the same, thus operating the described mechanism. The weight of the cyclometer is sufficient to hold it by gravity in a normal position.

I do not limit myself to the particular details of construction herein shown and described, and may vary the same in many particulars without departing from the spirit of my invention. The system of numbers on the registering wheels may also be variously modified.

The principal advantages peculiar to my device may be stated as follows: The arrangement of the casing in a vertical position and the provision of a transverse aperture in its periphery on the upper side, together with the arrangement of the registering wheels side-by-side within the casing, enables the cyclometer to be read from the seat without inconvenience to the rider. The above in combination with the annulus, $j$, and the gear on the shaft protruding through the side of the casing, makes a structure occupying a minimum lateral space. Further, the arrangement of parts within the casing where the pinions are mounted on the same shaft as the collar, $f$, and gear, $g$, is calculated to economize space, and at the same time provide efficient means for transmitting motion between the registering wheels. The annulus on the ground-wheel, and the gear, $g$, provide a positive means for transmitting motion from the ground-wheel when moving in either direction, and there can occur no accidental movement of the gear.

I claim—

1. In a cyclometer, the combination of a number of independently rotatable registering gear-wheels arranged side by side, and all but the last one of the series having projections for intermittent transmission of power, a shaft carrying an intermittently acting driver to turn one of the registering wheels, pinions loosely mounted on said shaft and meshing with the other registering wheels respectively, and arranged to be turned by the projections on the adjacent wheels, a gear affixed to the said shaft, and an intermittently acting driver arranged to be carried by the ground-wheel and to turn said gear step-by-step.

2. In a cyclometer, the combination of a number of independently rotatable registering gear-wheels arranged side by side, and all but the last one of the series having projections for intermittent transmission of power, a shaft carrying an intermittently acting driver to turn one of the registering wheels, pinions loosely mounted on said shaft and meshing with the other registering wheels respectively, and arranged to be turned by the projections on the adjacent wheels, spring detents engaging said pinions to prevent accidental rotation thereof, a gear on the said shaft, and an intermittently acting driver on the ground-wheel and co-acting with said gear.

3. A cyclometer comprising in its construction a casing having a transverse aperture; a bracket supporting said casing and adapted to be fastened to the fixed axle of the wheel and to hold the casing vertically with the aperture uppermost; a set of registering wheels arranged side by side within the casing and having graduated peripheries visible through the aperture in the casing; means for effecting intermittent transmission of motion between the registering wheels; and means for transmitting motion from the ground-wheel to the registering wheels including a shaft projecting through the side of the casing, a gear on said shaft having concaved teeth, and an annulus fastened to the wheel and having a single tooth for engagement with said gear, the periphery of said annulus fitting the concave teeth of the latter.

In testimony whereof I have signed my name to this specification, in the presence of two subscribing witnesses, this 17th day of March, A. D. 1894.

CHARLES E. MOSS.

Witnesses:
C. F. BROWN,
A. D. HARRISON.